United States Patent [19]

Hotta et al.

[11] Patent Number: 5,576,892

[45] Date of Patent: Nov. 19, 1996

[54] VARIABLE POWER OPTICAL SYSTEM

[75] Inventors: Keiichi Hotta; Ryota Ogawa, both of Tokyo; Hiroyuki Kato, Nagano-ken, all of Japan

[73] Assignee: Asahi Kogaku Kogyo Kabushiki Kaisha, Tokyo, Japan

[21] Appl. No.: 364,014

[22] Filed: Dec. 27, 1994

Related U.S. Application Data

[63] Continuation of Ser. No. 987,996, Dec. 9, 1992, abandoned, which is a continuation of Ser. No. 766,333, Sep. 27, 1991, abandoned, which is a continuation of Ser. No. 635,936, Dec. 28, 1990, Pat. No. 5,140,467.

[30] Foreign Application Priority Data

| Dec. 29, 1989 | [JP] | Japan | 1-151247 |
| Oct. 9, 1990 | [JP] | Japan | 2-271196 |
| Nov. 8, 1990 | [JP] | Japan | 2-117847 U |
| Nov. 30, 1990 | [JP] | Japan | 2-128640 U |
| Dec. 27, 1990 | [JP] | Japan | 2-407088 U |

[51] Int. Cl.$^6$ .................... G02B 15/14; G02B 23/00
[52] U.S. Cl. .................... 359/696; 359/422; 359/676
[58] Field of Search .................... 359/676, 642, 359/643, 694, 740, 739, 404, 407, 422, 432, 421, 646, 679, 686, 687, 738; 354/155, 219, 222, 223

[56] References Cited

U.S. PATENT DOCUMENTS

| 4,217,048 | 8/1980 | Egawa | 359/646 |
| 4,437,750 | 3/1984 | Ikari | 354/155 |
| 4,487,482 | 12/1984 | Itoh et al. | 350/429 |
| 4,548,481 | 10/1985 | Yamada | 359/421 |
| 4,634,236 | 1/1987 | Masuusko | 359/740 |
| 4,664,485 | 5/1987 | Momiyana et al. | 354/219 |
| 4,786,150 | 11/1988 | Tsuji | 354/223 |
| 4,842,395 | 6/1989 | Sato et al. | 354/679 |
| 5,071,242 | 12/1991 | Yanagisawa | 359/416 |
| 5,140,467 | 8/1992 | Hatta et al. | 359/696 |
| 5,311,355 | 5/1994 | Kato | 359/422 |

FOREIGN PATENT DOCUMENTS

| 56-41085 | 9/1981 | Japan . |
| 62-134617 | 6/1987 | Japan . |
| 64-57223 | 3/1989 | Japan . |

OTHER PUBLICATIONS

English Language Abstract of Japanese Publication No. 64-57223.

*Primary Examiner*—Thong Nguyen
*Attorney, Agent, or Firm*—Greenblum & Bernstein P.L.C.

[57] ABSTRACT

A zooming monocular or zooming binoculars having an objective optical system and an eyepiece optical system, which includes at least one variable power lens group driven in the optical axis in the eyepiece optical system, a movable field stop which is provided to define the field of view so as to move in the optical axis direction independently of the variable power lens group, and driving means for moving the movable field stop in association with the movement of the movable variable power lens group in the optical axis direction along a track different from a track of the movement of the movable power lens group. The power is varied by moving a part of the eyepiece or ocular optical system and a reference diopter is maintained constant upon variations of the power at $-1\pm0.5$ diopter.

20 Claims, 14 Drawing Sheets

Fig. 3C  Fig. 3B  Fig. 3A
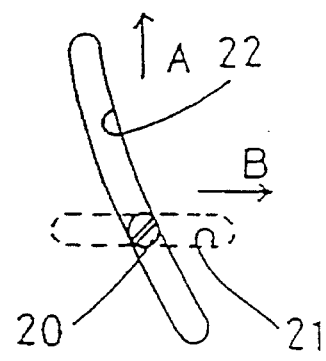
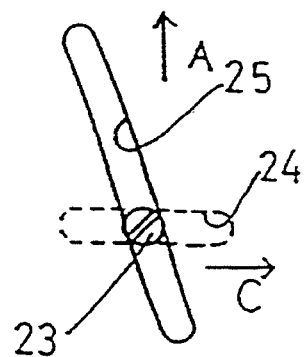
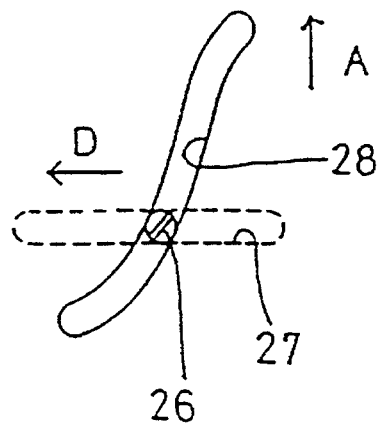
Fig. 4
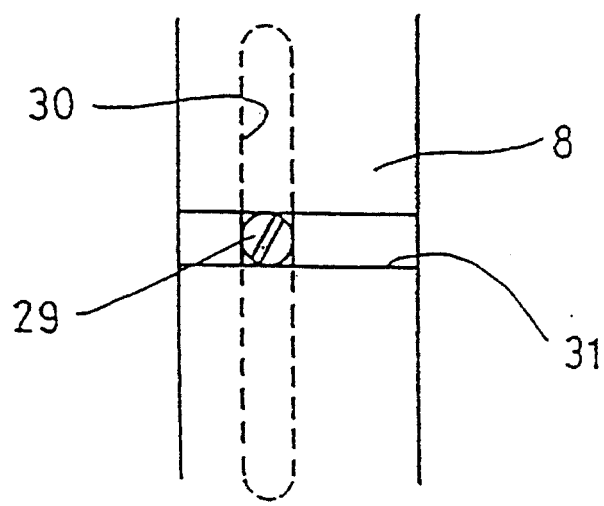

FIG.7
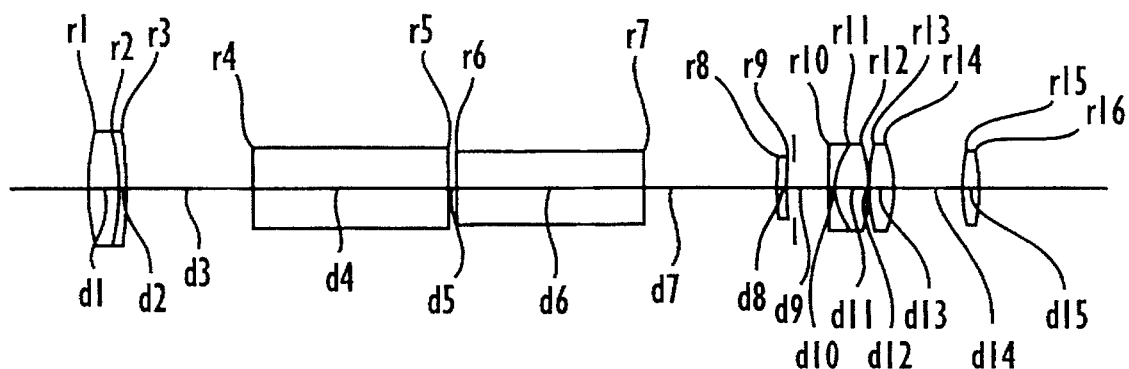
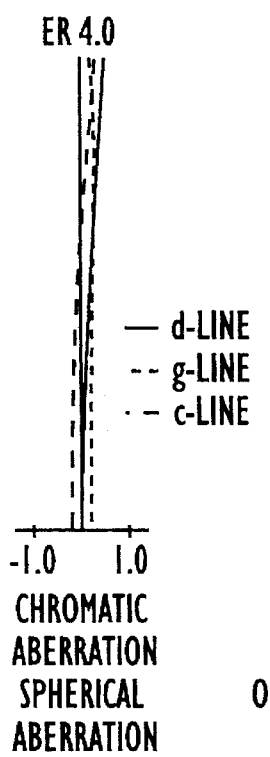
FIG.8A
ER 4.0
— d-LINE
-- g-LINE
-·- c-LINE
-1.0  1.0
CHROMATIC
ABERRATION
SPHERICAL
ABERRATION
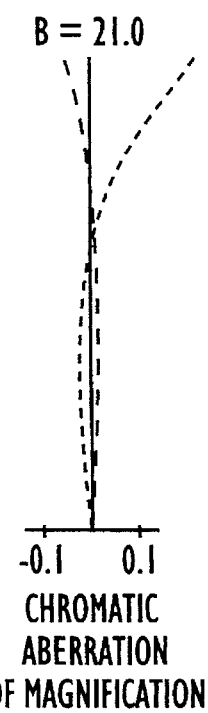
FIG.8B
B = 21.0
-0.1  0.1
CHROMATIC
ABERRATION
OF MAGNIFICATION
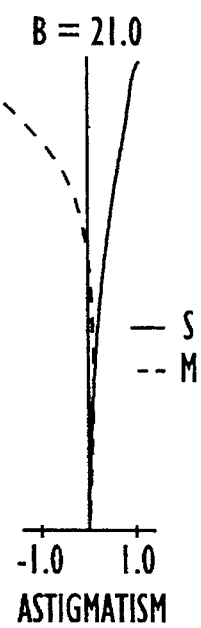
FIG.8C
B = 21.0
— S
-- M
-1.0  1.0
ASTIGMATISM
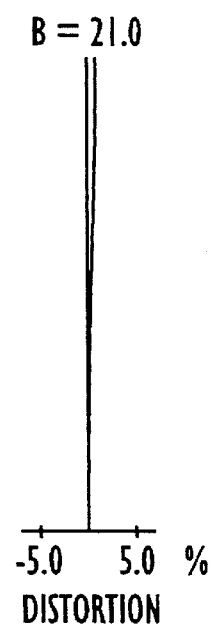
FIG.8D
B = 21.0
-5.0  5.0 %
DISTORTION

FIG.9
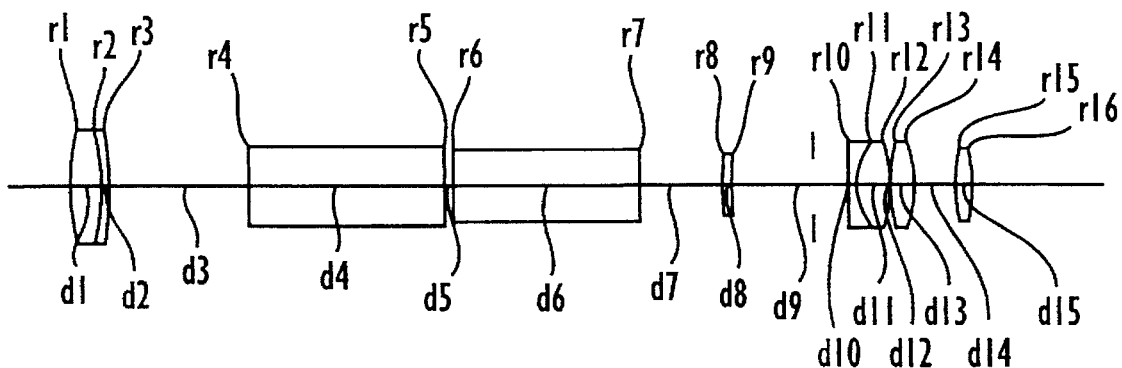
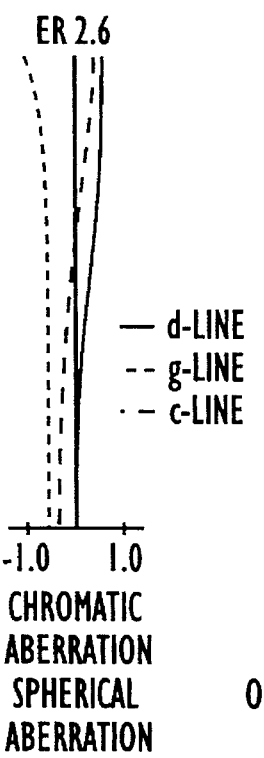
FIG.10A
ER 2.6
d-LINE
g-LINE
c-LINE
-1.0  1.0
CHROMATIC
ABERRATION
SPHERICAL
ABERRATION
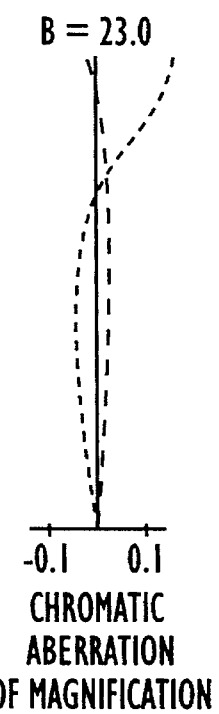
FIG.10B
B = 23.0
-0.1  0.1
CHROMATIC
ABERRATION
OF MAGNIFICATION
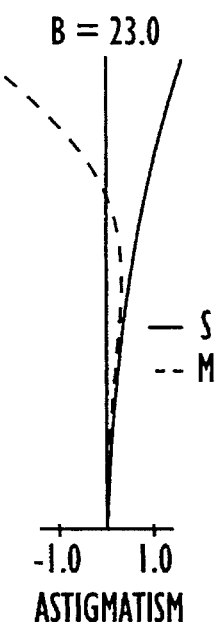
FIG.10C
B = 23.0
— S
-- M
-1.0  1.0
ASTIGMATISM
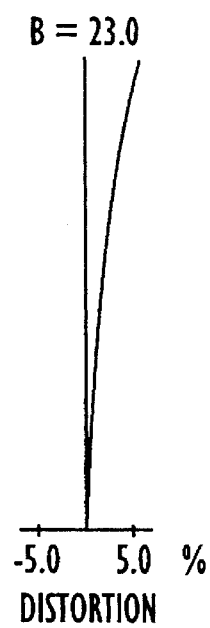
FIG.10D
B = 23.0
-5.0  5.0  %
DISTORTION FIG. 11
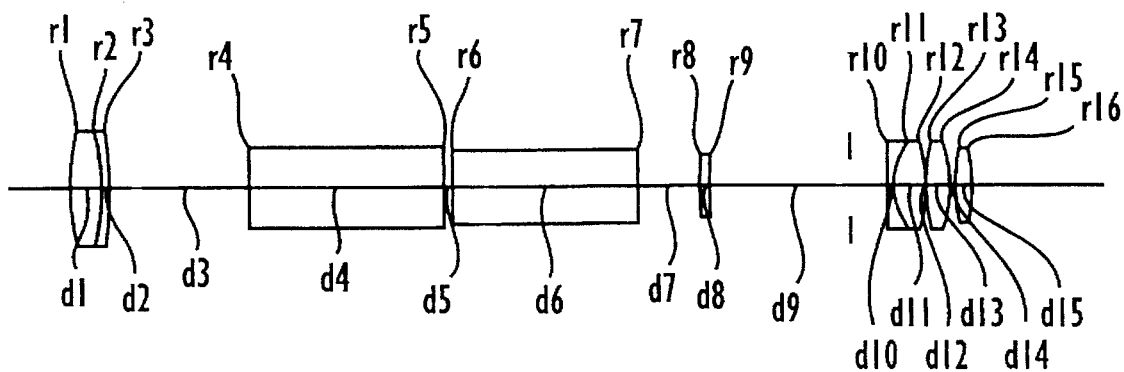
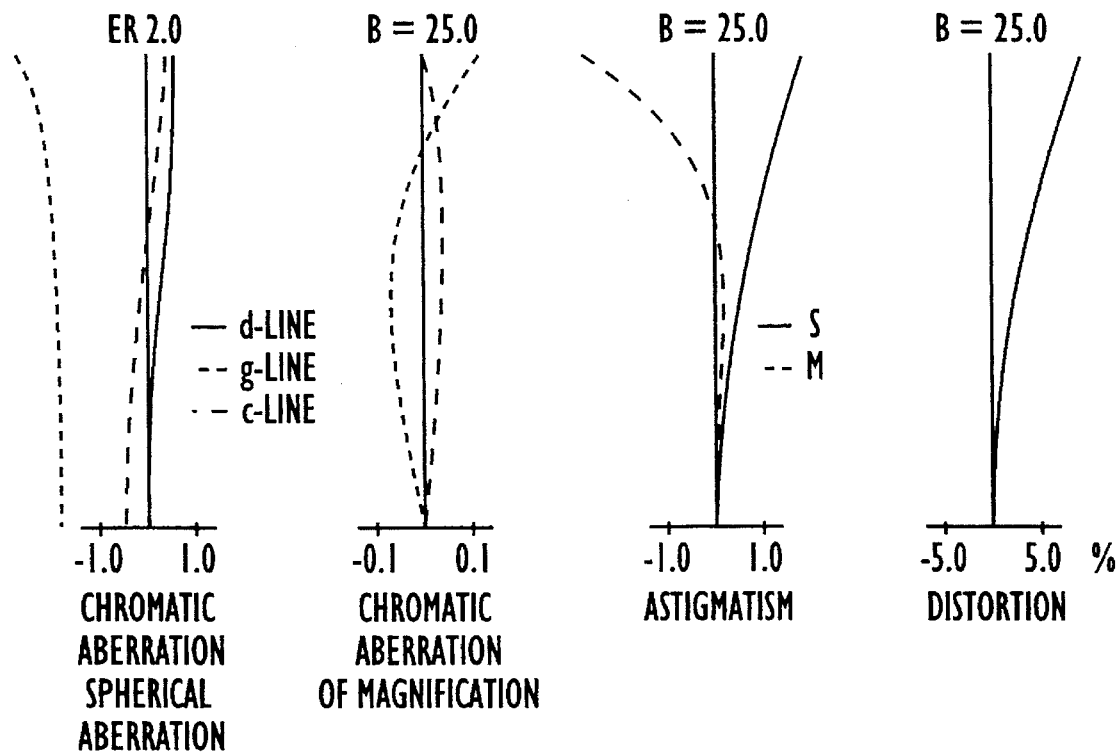

FIG.13
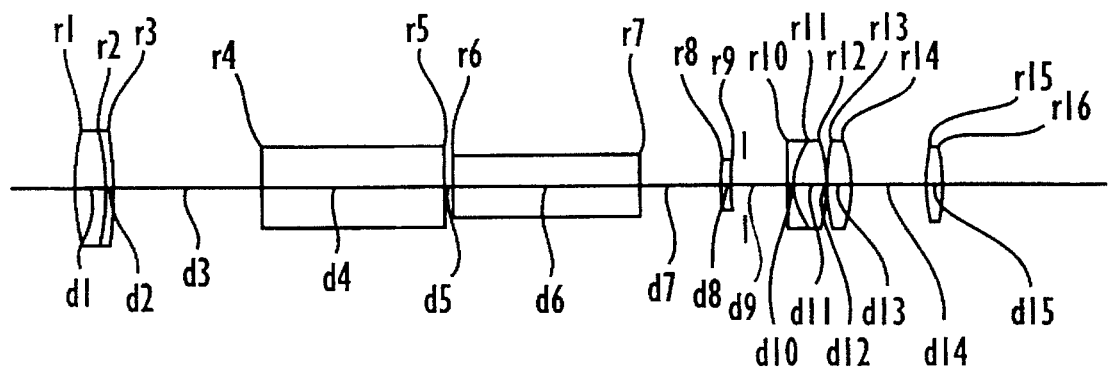
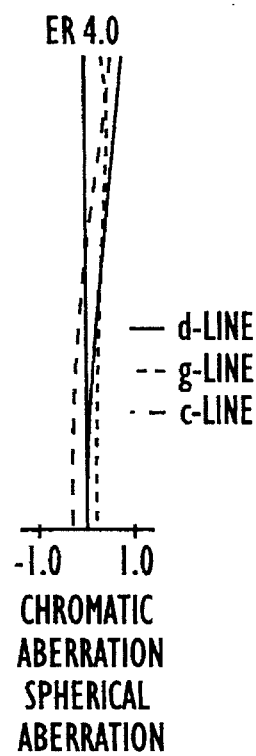
FIG.14A
ER 4.0
— d-LINE
-- g-LINE
-·- c-LINE
-1.0  1.0
CHROMATIC
ABERRATION
SPHERICAL
ABERRATION
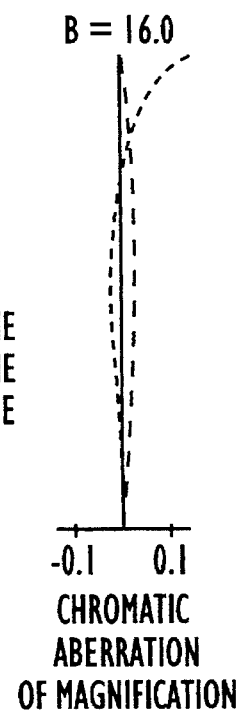
FIG.14B
B = 16.0
-0.1  0.1
CHROMATIC
ABERRATION
OF MAGNIFICATION
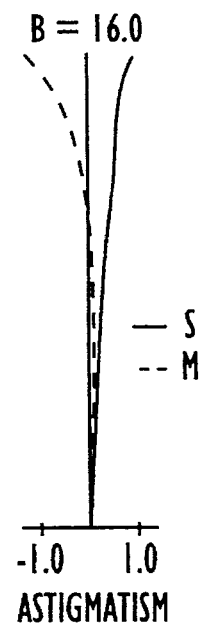
FIG.14C
B = 16.0
— S
-- M
-1.0  1.0
ASTIGMATISM
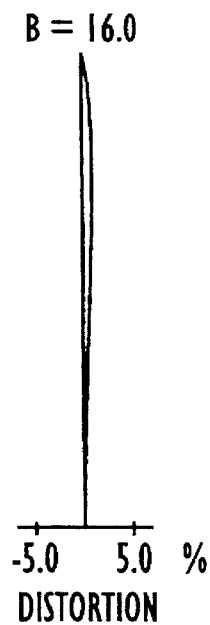
FIG.14D
B = 16.0
-5.0  5.0  %
DISTORTION

ER 2.6

-1.0  1.0
CHROMATIC
ABERRATION
SPHERICAL
ABERRATION

— d-LINE
-- g-LINE
·— c-LINE

B = 17.5

-0.1  0.1
CHROMATIC
ABERRATION
OF MAGNIFICATION

B = 17.5

-1.0  1.0
ASTIGMATISM

— S
-- M

B = 17.5

-5.0  5.0  %
DISTORTION

FIG.17
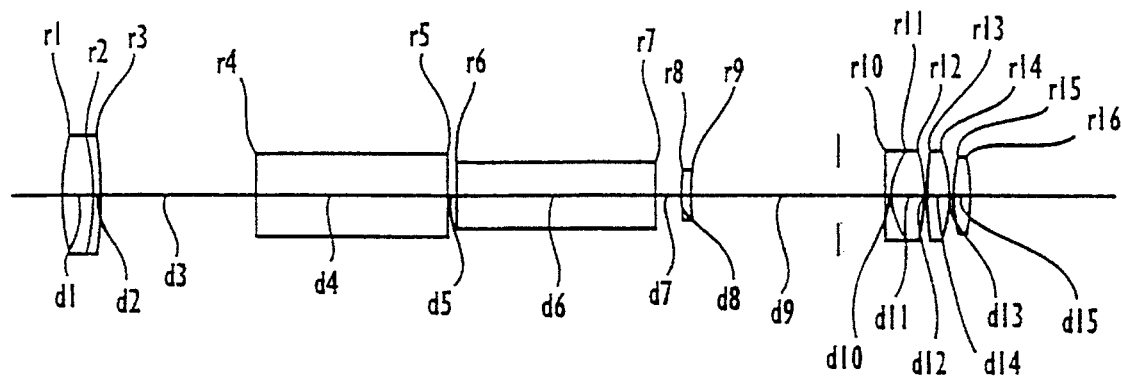
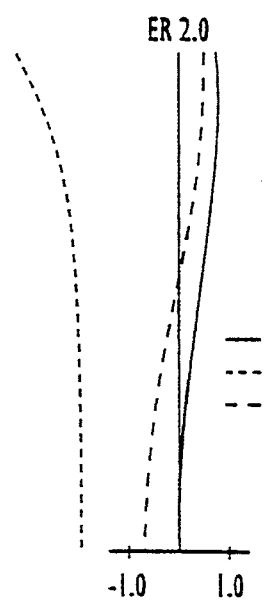
FIG.18A
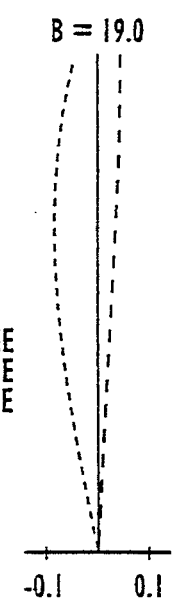
FIG.18B
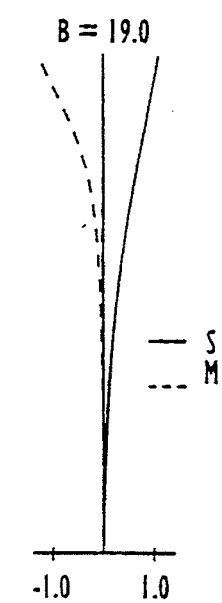
FIG.18C
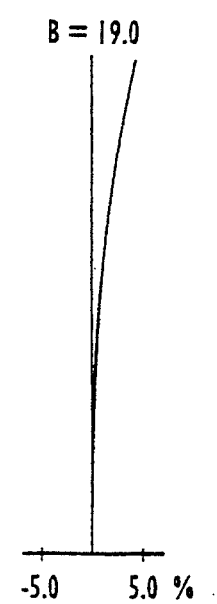
FIG.18D ER 4.0
— d-LINE
--- g-LINE
-·- c-LINE
-1.0   1.0
CHROMATIC
ABERRATION
SPHERICAL
ABERRATION

B = 16.0
-0.1   0.1
CHROMATIC
ABERRATION
OF MAGNIFICATION

B = 16.0
— S
--- M
-1.0   1.0
ASTIGMATISM

B = 16.0
-5.0   5.0 %
DISTORTION

ER 2.6

CHROMATIC
ABERRATION
SPHERICAL
ABERRATION

B = 17.5

CHROMATIC
ABERRATION
OF MAGNIFICATION

B = 17.5

ASTIGMATISM

B = 17.5

DISTORTION

FIG.23
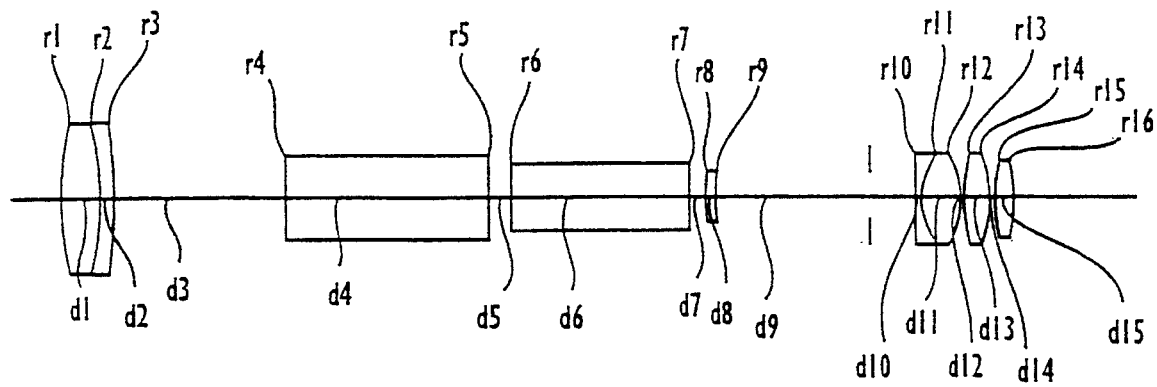
FIG.24A  FIG.24B  FIG.24C  FIG.24D
ER 2.0   B = 19.0  B = 19.0  B = 19.0
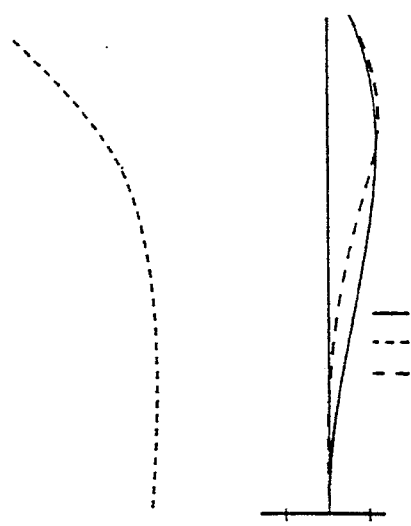
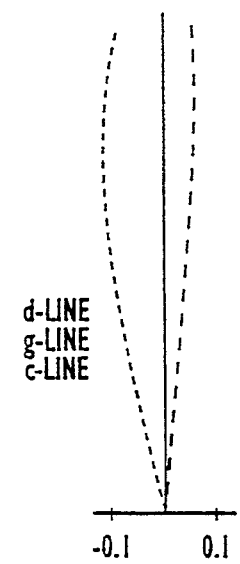
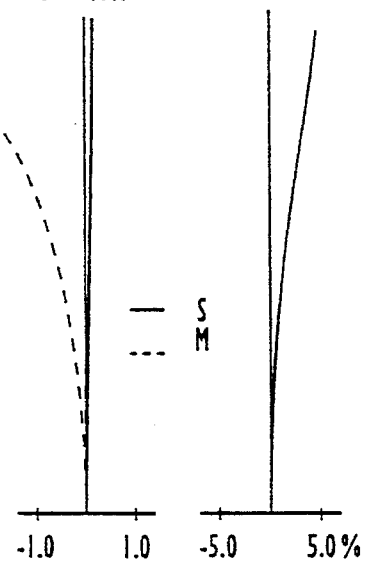
—— d-LINE
---- g-LINE
-- c-LINE
—— S
---- M
CHROMATIC  ABERRATION    CHROMATIC      ASTIGMATISM   DISTORTION
                         ABERRATION
SPHERICAL  ABERRATION    OF MAGNIFICATION

VARIABLE POWER OPTICAL SYSTEM

CROSS-REFERENCE TO RELATED APPLICATION

This application is a continuation of application Ser. No. 07/987,996, filed Dec. 9, 1992, now abandoned; which is a continuation of application Ser. No. 07/766,333, filed Sept. 27, 1991, now abandoned; which is a continuation of application Ser. No. 07/635,936, filed Dec. 28, 1990, which issued as U.S. Pat. No. 5,140,467 on Aug. 18, 1992.

BACKGROUND OF THE INVENTION

1. Field of the Invention

The present invention is related to a zooming monocular or zooming binoculars.

2. Description of Related Art

In a known monocular or binoculars, an objective optical system and an eyepiece optical system are necessarily provided. Note that the term "binoculars" referred to hereinafter includes both the binoculars and the monocular. Zooming binoculars of a conventional type have at least one variable power lens group in their objective optical system. In this conventional type binoculars, since a field stop (diaphragm) to determine the field of view is fixed (immovable in the optical axis direction), even though the contour of the field stop is made clear at a specific focal length (magnification), the contour of the field stop becomes unclear at other focal lengths. Due to this unclear contour of the field stop, the circumferential portion of the field of view is dimmed.

SUMMARY OF THE INVENTION

One object of the present invention is to eliminate the above-mentioned drawback by moving a field stop (field stop ring) observed through the eyepiece optical system to a position which coincides with the position of an image formed by the objective optical system, regardless of zooming thereof. The movement of the field stop mentioned above prevents the occurrence of the dimming of the contour of the field stop, regardless of the focal length.

To achieve the object mentioned above, according to the present invention, there is provided a monocular or binoculars having an objective optical system and an eyepiece optical system, comprising at least one variable power lens group which is driven to move in an optical axis direction in the eyepiece optical system, a movable field stop which is provided to define the field of view so as to move in the optical axis direction independently of the variable power lens group, and a driving means for moving the movable field stop in association with the movement of the movable variable power lens group in the optical axis direction along a track different from the track of the movement of the movable power lens group.

Preferably, another variable power lens group is also provided in the objective optical system so that the variable power lens group can be moved in the optical axis direction in association with the variable power lens group in the eyepiece optical system.

According to one aspect of the present invention, the movable field stop is located between the variable power lens group in the objective optical system (objective variable power lens group) and the variable power lens group in the eyepiece optical system (eyepiece variable power lens group). During continuous change of magnification, from small to large, the objective variable lens group moves forwardly, and the eyepiece variable power lens group moves rearwardly. At this time, the field stop is arranged to move rearwardly, so that a field of view without dimming of the contour of the field stop is obtained. The rear travelling distance of the movable field stop is, for example, set to be smaller than that of the eyepiece variable power lens group.

The driving means of the movable field stop can be comprised of a guide pin provided on the movable field stop, a non-rotatable inner cylinder which has a linear movement guide groove in which the guide pin is movably guided in the optical axis direction, an intermediate cylinder which is rotatably fitted on the inner cylinder and which has a cam groove in which the guide pin is fitted, and a rotational operating means for rotating the intermediate cylinder.

According to another aspect of the present invention, there is provided a zooming monocular or zooming binoculars comprising an objective optical system, an eyepiece optical system which in turn comprises at least one variable power lens group, a movable field stop which is located between the objective optical system and the eyepiece optical system to define the field of view, the movable field stop which is movable in the optical axis, an inner cylinder in which the variable power lens groups and the movable field stop are fitted so as to move in the optical axis direction independently, and a single driving means for independently moving the variable power lens groups and the movable field stop in the optical axis direction at one time.

Another object of the present invention is to provide an afocal variable power optical device which can obtain a clear view in zooming binoculars.

To achieve the object mentioned directly above, according to the present invention, there is provided the afocal variable power optical device which comprises an objective optical system located on the object's side of a field stop ring to limit a field stop, and an eyepiece optical system which is located at the eye's side of the field stop ring. In this arrangement, zooming is performed by moving at least one of the systems, and the field stop ring is moved in accordance with the zooming to an appropriate position in which no dimming of the contour of the field stop occurs. Furthermore, in the afocal variable power optical device mentioned above, the reference diopter at specific distance, which is invariable regardless of variable powering is set equal to the diopter of the field stop ring which is observed through the eyepiece optical system.

BRIEF DESCRIPTION OF THE DRAWINGS

The present invention will be described below in detail, with reference to the accompanying drawings, in which:

FIGS. 3A, 3B and 3C are developed plan views of a zooming operational portion of a pair of movable variable power lens groups and a movable field stop in an eyepiece optical system shown in FIG. 2;

FIG. 4 is a developed plan view of an engaging mechanism of a zoom ring and an intermediate cylinder, according to the present invention;

FIG. 5 is a cross-sectional view of an upper half of the eyepiece optical system; and FIG. 6 is a cross sectional view of a guide pin portion of the device shown in FIG. 5;

FIGS. 7 through 12 show a first example of the lens arrangement: FIG. 7 is a view of the lens at low magnification; FIG. 8 is a view showing various aberrations during low magnification; FIG. 9 is a view of the lens at middle magnification; FIG. 10 is a view showing various aberrations at middle magnification; FIG. 11 is a view of the lens at high magnification; and FIG. 12 is a view showing various aberrations at high magnification;

FIGS. 13 through 18 show a second example of the lens arrangement: FIG. 13 is a view of the lens at low magnification; FIG. 14 is a view showing various aberrations at the time of low magnification; FIG. 15 is a view of the lens at the time of middle magnification; FIG. 16 is a view showing various aberrations at middle magnification; FIG. 17 is a view of the lens at high magnification; FIG. 18 is a view showing various aberrations at high magnification; and FIGS. 19 through 24 show a third example of the lens arrangement: FIG. 19 is a view of the lens at low magnification; FIG. 20 is a view showing various aberrations at low magnification; FIG. 21 is a view of the lens at the time of middle magnification; FIG. 22 is a view showing various aberrations at middle magnification; FIG. 23 is a view of the lens at high magnification; FIG. 24 is a view showing various aberrations at high magnification.

DESCRIPTION OF THE PREFERRED EMBODIMENTS

Figure 1A:
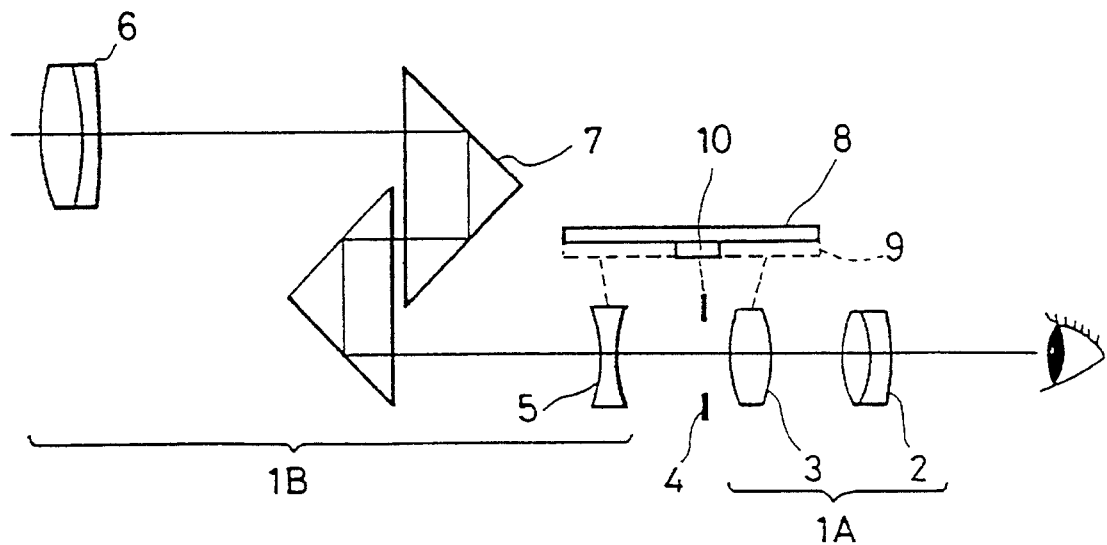
FIGS. 1A and 1B are conceptual views of zooming binoculars according to the present invention, at the smallest magnification and the largest magnification, respectively.
Figure 1B:
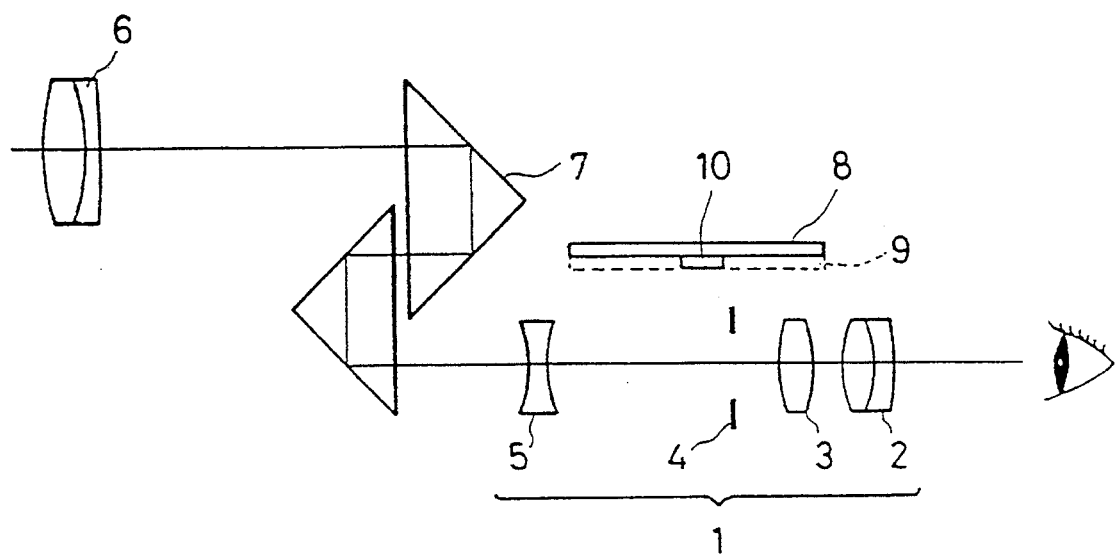

FIGS. 1A and 1B; how a basic structure of zooming binoculars according to the present invention. An eyepiece lens system 1A comprises an immovable lens group 2 and a variable power lens group (eyepiece variable power lens group) 3. An objective lens system 1B comprises a variable power lens group (objective variable power lens group) 5, a porro-prism 7 and an immovable lens group 6. A movable field stop 4 is provided between the eyepiece variable power lens group 3 and the objective variable power lens group 5, The variable power lens groups 3 and 5 and the movable field stop 4 move between the smallest magnification position (e.g. 6×) shown in FIG. 1A and the largest magnification position (e.g. 12×) shown in FIG. 1B during the zooming operation. Specifically, when the magnification changes from the smallest value toward the largest value, the objective variable power lens group 5 moves forwardly and the eyepiece variable power lens group 3 moves rearwardly to increase the spatial distance therebetween. On the other hand, the movable field stop 4 moves rearwardly to provide a clear field of view without a dimmed circumference.

A pair of the variable power lens groups 3 and 5 is connected to a drive mechanism 9, which converts the rotational movement of a zoom ring 8 to a linear movement of the variable power lens groups 3 and 5 in the optical axis direction. The movable field stop 4 is connected to an association mechanism 10, which is connected to the drive mechanism, to convert the rotational movement of the zoom ring 8 to a linear movement of the field stop 4.

In FIGS. 2, 3A, 3B, 3B, 3C, and 4, neither the immovable lens group 6 nor the porro-prism 7 are shown. An eyepiece lens frame 13 is screw-engaged by one end of a body 12 and is fitted in an outer cylinder 14. The eyepiece lens frame 13 is provided, on the outer periphery of the end adjacent to the body 12, with the zoom ring 8 (single operational member), which is rotatably fitted on the eyepiece lens frame 13.

An inner cylinder 15 is concentrically connected to the inside of the eyepiece lens frame 13. An intermediate cylinder 16 is rotatably fitted between the inner cylinder 15 and the eyepiece lens frame 13.

A frame body 17 which supports the eyepiece variable power lens group 3, a frame body 18 which supports the field stop 4, and a frame body 19, which supports the object variable power lens group 5, are provided in the inner cylinder 15 so as to move in the optical axis direction. The immovable lens group 2 is secured to an opening end of the eyepiece lens frame 13.

To make it possible to move the eyepiece variable power lens group 3 only in the optical axis direction, a guide pin 20, which is provided on the frame body 17, is engaged in a corresponding linear movement guide groove 21 of the inner cylinder 15 extending in the optical axis direction. The front end of the guide pin 20 is also engaged in a cam groove 22, which is formed on the peripheral wall of the intermediate cylinder 16, as shown in FIG. 3A.

Similarly, to make it possible to move the field stop 4 only in the optical axis direction, a guide pin 23, which is provided on the frame body 18, is engaged in a corresponding linear movement guide groove 24 of the inner cylinder 15 extending in the optical axis direction. The front end of the guide pin 23 is also engaged in a cam groove 25 formed on the peripheral wall of the intermediate cylinder 16, as shown in FIG. 3B.

Furthermore, to make it possible to move the object variable lens group 5 only in the optical axis direction, a guide pin 26, which is provided on the frame body 19, is engaged in a corresponding linear movement guide groove 27 of the inner cylinder 15 extending in the optical axis direction. The front end of the guide pin 26 is also engaged in a cam groove 28 formed on the peripheral wall of the intermediate cylinder 16, as shown in FIG. 3C.

The profiles of the cam grooves 22, 25 and 28, shown in FIGS. 3A, 3B and 3C, are such that the necessary zooming operation can be effected according to each magnification and no dimming of the contour of the movable field stop 4 occurs. In other words, the position of an image formed by the objective optical system 1B moves according to the movement of the objective variable lens group 5. The eyepiece variable lens group of the eyepiece optical system 1A moves to enlarge and clearly observe the above image formed by the object optical system 1B. The field stop 4 is always moved to a position where the image, formed by the object optical system 1B, of the object at the specific distance is formed. In the illustrated embodiment, the rearward displacement of the movable field stop 4 becomes smaller than that of the eyepiece variable power lens group 3 as the magnification of the eyepiece lens system 1A changes from the smallest value toward the largest value.

Figure 2:
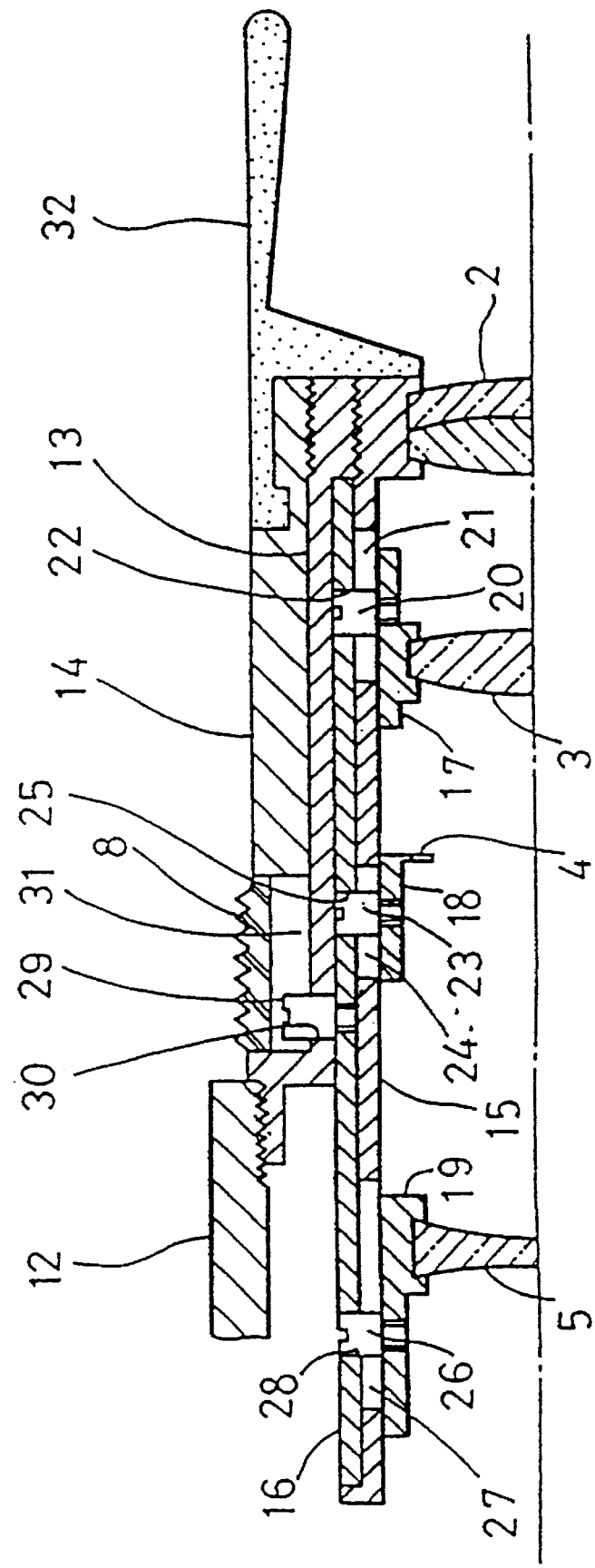
FIG. 2 is a longitudinal sectional view of an upper half of an eyepiece optical system used in zooming binoculars according to the present invention.

A pin 29, provide on the outer periphery of the intermediate cylinder 16, is fitted in an elongated guide hole 30 which is formed on the peripheral wall of the eyepiece lens frame 13 to extend in the circumferential direction. The front end of the pin 29 is engaged in a groove 31 which extends in the optical axis direction on the inner periphery of the zoom ring 8. Consequently, the rotational movement of the zoom ring 8 is transmitted to the intermediate cylinder The guide pin 20, the linear movement guide groove 21, the cam groove 22, the guide pin 26, the linear movement guide groove 27 and the cam groove 28, as shown in FIG. 2, constitute the drive mechanism 9 in FIG. 1. The guide pin 23, the linear movement guide groove 24 and the cam groove 25 constitute the association mechanism 10 shown in FIG. 1. In FIG. 2, reference numeral 32 designates an eye cup.

The binoculars, as constructed above, operate as follows.

When the zoom ring 8 is rotated, for example, in the clockwise direction upon zooming, the rotation of the zooming ring 8 is transmitted to the intermediate cylinder 16 through the groove 31 and the pin 29, so that the intermediate cylinder 16 rotates in take same direction as the zoom ring 8. The rotation of the intermediate cylinder 16 in the clockwise direction causes the cam grooves 22, 25 and 28 to move in the direction shown by arrow A in FIGS. 3A–3C, so that the guide pin 20, fitted in the cam groove 22, moves in the direction B along the linear movement guide groove 21 in accordance with the cam profile of the cam groove 22, as shown in FIG. 3A. Simultaneously, the guide pin 23, fitted in the cam groove 25, moves in the direction C along the linear movement guide groove 24 in accordance with the cam profile of the cam groove 25, as shown in FIG. 3B. Similarly, the guide pin 26, fitted in the cam groove 28, moves in the direction D along the linear movement guide groove 27 in accordance with the cam profile of the cam groove 28, as shown in FIG. 3C.

When the guide pins 20, 23 and 26 move in the directions B, C and D, as mentioned above, the eyepiece variable power lens group 3, the field stop 4 and the objective variable power lens group 5 integral therewith are moved in the same direction. When the zoom ring 8 is rotated by the maximum displacement in the clockwise direction, the variable power lens groups 3 and 5, and the field stop 4 are brought into a position shown in FIG. 1B. In this state, if the magnification range of the zooming optical system is 6×~12×, the magnification of 12× is obtained.

It should be appreciated that since the field stop 4 is moved to an appropriate position in which no dimming of the field of view occurs, depending on the magnification which varies by the zooming, no dimming of the field stop takes place, thus resulting in a clear field of view.

When the zooming ring 8 is rotated in the counterclockwise direction, the positions of the variable power lens groups 3 and 5, and the field stop 4 are moved from those of FIG. 1B to those of FIG. 1A to reduce the magnification. Also, in, this case, since the field stop 4 is moved in accordance with the magnification to an appropriate position in which no dimming occurs, a clear field of view can be ensured. This differs from the prior art in which the circumferential portion of the field of view is dimmed or is partially cut.

Figure 5:
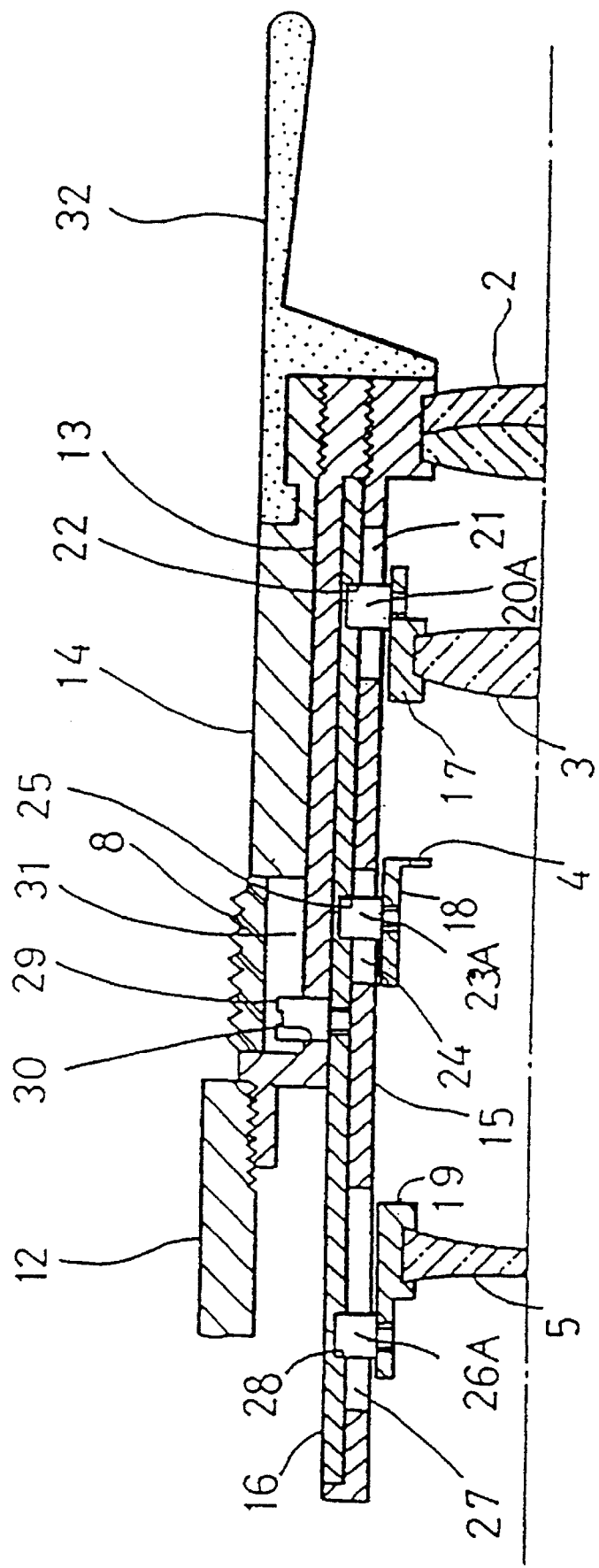
FIGS. 5 and 6 show another embodiment of the present invention.
Figure 6:
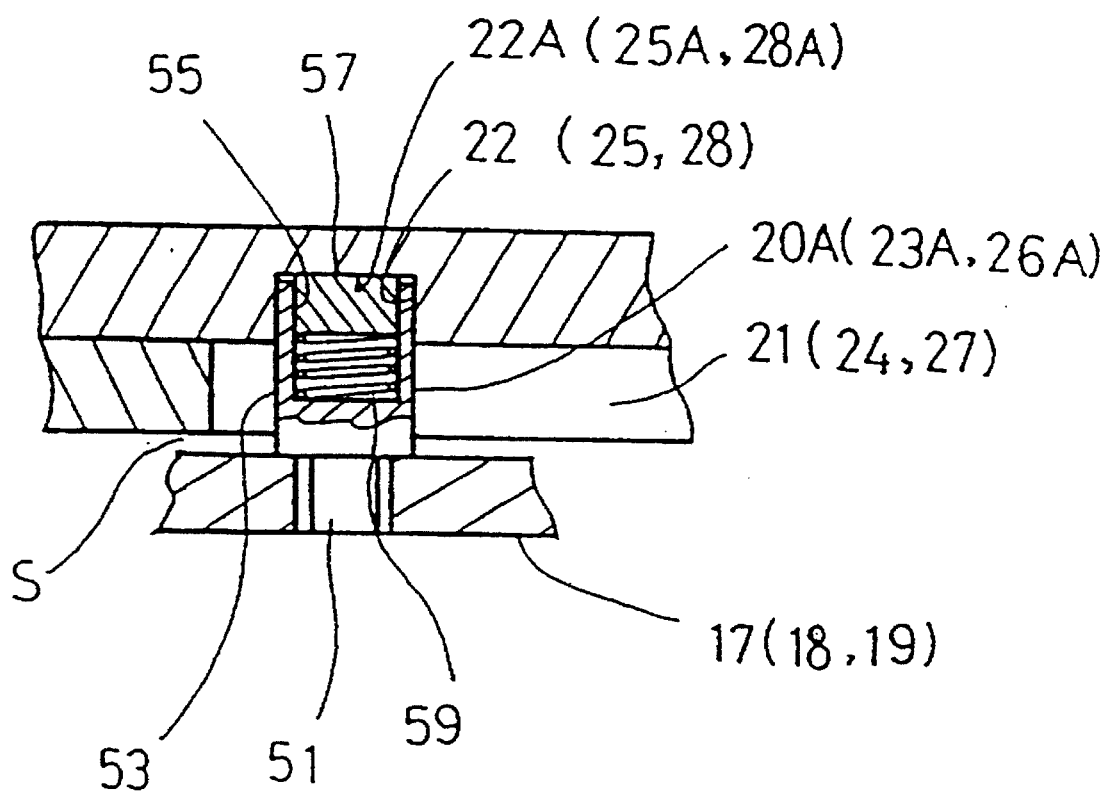

FIGS. 5 and 6 show another embodiment of the present invention. This embodiment prevents the frame bodies 17, 18, and 19 from inclining with respect to the optical axis even though the engaging length of these frame bodies to the inner cylinder 15 are short. One end of the guide pin 20A is connected to the frame body 17, and the other end is movably engaged in the cam groove 22 of the intermediate cylinder 16 and the linear movement guide groove 21 of the inner cylinder 15. Similar to the above, one end of the guide pin 23A is connected to the frame body 18, and the other end is movably engaged in the cam groove 25 and the linear movement guide groove 24. In addition, one end of the guide pin 26A is connected to the frame body 19, and the other end is movably engaged in the cam groove 28 and the linear movement guide groove 27.

As shown in FIG. 6, the cam groove 22 (25, 28) has a bottom surface 22A (25A, 28A). A space S is maintained between the outer surface of the frame body 17 (18, 19) and the inner surface of the inner cylinder 15, so that the frame body 17 (18, 19) and the inner cylinder 15 do not come into contact with each other.

The guide pin 20A comprises a male thread portion 51 and a main portion 53 which is engaged in the linear movement guide groove 21 and the cam groove 22. The main portion 53 includes a cylindrical hole 55 having an open end at its outer end.

An annular bar 57 is slidingly inserted in the cylindrical hole 55. The annular bar 57 is pressed in the direction from which the bar 57 protrudes from the concave portion 55 by a coil spring 59.

Similar to the guide pin 20A, the guide pins 23A and 26A have the concave portion 55 in which the annular bar 57 and the coil spring 59 are assembled.

The guide pins 20A, 23A and 26A are provided at plural spots, for example the three equiangular locations, of the outer periphery of the frame bodies 17, 18 and 19, respectively, as in the first embodiment. The linear movement guide grooves 21, 24, and 27 are provided on plural locations, for example, the three locations of the inner cylinder 15 as in the first embodiment. The cam grooves 22, 25, and 28 are also provided on plural locations, for example, the three locations of the intermdiate cylinder 16, as in the first embodiment According to the arrangement mentioned above, the frame bodies 17, 18, and 19 are always pressed by the coil spring 59 toward the axis of the inner cylinder 15, through the annular bar 57 and the guide pins 20A, 23A, and 26A. Consequently, even in the case where the axial length of the frame bodies 17, 18, and 19 is not enough, the frame bodies 17, 18, and 19 can be supported in a non-contacting manner against the inner cylinder 15, and the frame bodies 17, 18, and 19 can be smoothly moved in the axial direction without inclining with respect to the optical axis.

Following are three examples of the lens arrangements of the eyepiece optical system of the present invention. In the examples below, a reference diopter at the specific distance, which is not varied by magnification-change, is set to be −1 diopter. The diopter of field stop, which is observed through the eyepiece optical system, is set to −1 diopter.

FIRST EXAMPLE OF THE LENS ARRANGEMENT

FIGS. 7, 9, and 11 show the first lens arrangement of the variable power optical system of the present invention. FIG. 7 shows an arrangement during low magnification; FIG. 9 shows an arrangement at middle magnification; and FIG. 11 shows an arrangement at high magnification.

The values related to the above figures are shown in Table 1. The legends in Table 1 are as follows:

r: radius of curvature of lens surface d: thickness of lens, or interval of lenses n: refractive index of lens υ: Abbe's number $f_0$: focal length of object optical system $f_e$: focal length of eye piece optical system ω: half field angle In the first arrangement of the lens, magnification is changed in accordance with the changes of d7, d9, and d14. The values showing the changes are shown in Table 2. The surfaces from the fourth to the seventh are surfaces of an erect prism.

Aberrations at the low magnification in this arrangement are shown in FIG. 8, the,middle magnification in FIG. 10, and the high magnification in FIG. 12, respectively.

TABLE 1

| Surface No. | r | d | n | υ |
| --- | --- | --- | --- | --- |
| 1 | 63.811 | 4.79 | 1.51633 | 64.1 |
| 2 | −38.439 | 1.31 | 1.62004 | 36.3 |
| 3 | −117.465 | 23.76 | | |
| 4 | infinity | 33.26 | 1.56883 | 56.3 |
| 5 | infinity | 1.58 | | |
| 6 | infinity | 30.09 | 1.56883 | 56.3 |
| 72 | infinity | variable | | |
| 8 | −70.480 | 1.31 | 1.51633 | 64.1 |
| 9 | 26.398 | variable | | |
| 10 | −322.719 | 1.31 | 1.80518 | 25.4 |
| 11 | 11.419 | 5.82 | 1.71300 | 53.8 |
| 12 | −23.749 | 0.17 | | |
| 13 | 55.560 | 3.72 | 1.51633 | 64.1 |
| 14 | −21.238 | variable | | |
| 15 | 35.161 | 2.56 | 1.51633 | 64.1 |
| 16 | −54.737 | | | |

TABLE 2

| | Magnification | | |
| --- | --- | --- | --- |
| | Low | Middle | High |
| $f_o$ | 100.00 | 133.95 | 158.93 |
| $f_e$ | 16.69 | 15.02 | 13.36 |
| ω (°) | 3.50 | 2.50 | 2.08 |
| d7 | 23.27 | 14.41 | 10.30 |
| d9 | 7.03 | 21.13 | 31.71 |
| d14 | 12.28 | 7.04 | 0.57 |

Since the variable power ratio between the focal length "few" of the ocular optical system at the low magnification and the focal length "fet" of the ocular optical system at the high magnification is 1.25 (=few/fet), change in the apparent field of view by power variation can be decreased.

Table 3 shows the distance between the field stop ring and the surface "r10" which is the closest to the object's side in the eye piece optical system.

TABLE 3

| | Magnification | | |
| --- | --- | --- | --- |
| | Low | Middle | High |
| r10 | −6.54 | −7.24 | −7.83 |

SECOND EXAMPLE OF THE LENS ARRANGEMENT

Figure 15:
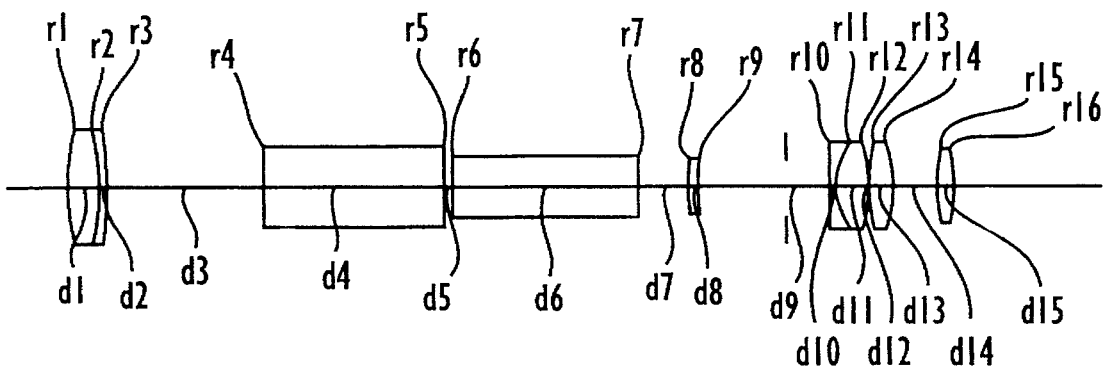
Figure 16A:
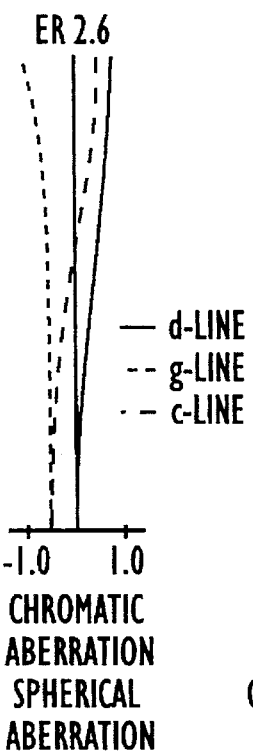
Figure 16B:
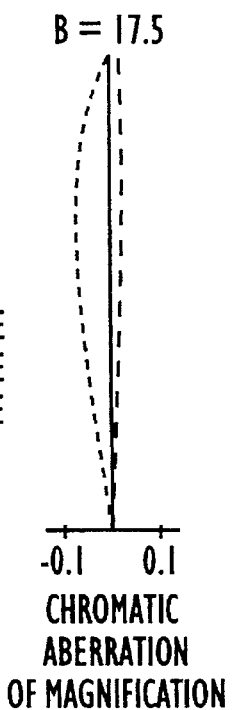
Figure 16C:
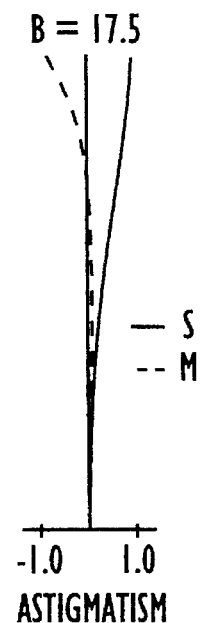
Figure 16D:
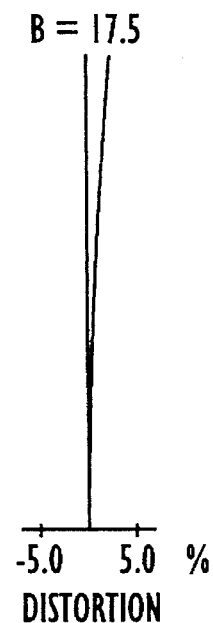

FIGS. 13, 15, and 17 show the second lens arrangement of the variable power optical system of the present invention. FIG. 13 shows the arrangement at the low magnification; FIG. 15 shows an arrangement at the middle magnification; and FIG. 17 shows an arrangement at the high magnification.

The values related to the above figures are shown in Table 4. The legends in Table 4 are the same as Table 1.

In the first arrangement of lens, magnification is changed in accordance with the changes of d7, d9, and d14. The values, showing the changes, are shown in Table 7. The surfaces from the fourth to the seventh are surfaces of an erect prism.

Aberrations in low magnification, in this arrangement, are shown in FIG. 14, the middle magnification in FIG. 16, and the high magnification in FIG. 18, respectively.

TABLE 4

| Surface No. | r | d | n | υ |
| --- | --- | --- | --- | --- |
| 1 | 57.232 | 4.99 | 1.51633 | 64.1 |
| 2 | −36.823 | 1.45 | 1.62004 | 36.3 |
| 3 | −116.590 | 25.89 | | |
| 4 | infinity | 29.93 | 1.56883 | 56.3 |
| 5 | infinity | 1.81 | | |
| 6 | infinity | 29.93 | 1.56883 | 56.3 |
| 7 | infinity | variable | | |
| 8 | −41.540 | 1.81 | 1.51633 | 64.1 |
| 9 | 26.168 | variable | | |
| 10 | 55.235 | 1.18 | 1.80518 | 25.4 |
| 11 | 10.857 | 5.62 | 1.71300 | 53.8 |
| 12 | −22.194 | 0.36 | | |
| 13 | 145.117 | 2.63 | 1.51633 | 64.1 |
| 14 | −26.719 | variable | | |
| 15 | 19.391 | 2.36 | 1.51633 | 64.1 |
| 16 | 141.943 | | | |

TABLE 5

| | Magnification | | |
| --- | --- | --- | --- |
| | Low | Middle | High |
| $f_o$ | 100.00 | 131.84 | 155.83 |
| $f_e$ | 16.45 | 14.68 | 13.14 |
| ω (°) | 2.67 | 1.94 | 1.58 |
| d7 | 14.31 | 7.77 | 4.61 |
| d9 | 10.23 | 22.23 | 31.36 |
| d14 | 13.37 | 7.09 | 1.93 |

Since the variable power ratio between the focal length "few" of the ocular optical system at the low magnification and the focal length "fet" of the ocular optical system at the high magnification is 1.25 (few/fet), the change of the apparent field of view by the power variation can be decreased.

Table 6 shows the distance between the field stop ring and the surface "r10" which is the closest to the object's side in the eye piece optical system.

TABLE 6

| | Magnification | | |
| --- | --- | --- | --- |
| | Low | Middle | High |
| r10 | −7.25 | −7.79 | −8.33 |

THIRD EXAMPLE OF THE LENS ARRANGEMENT

Figure 19:
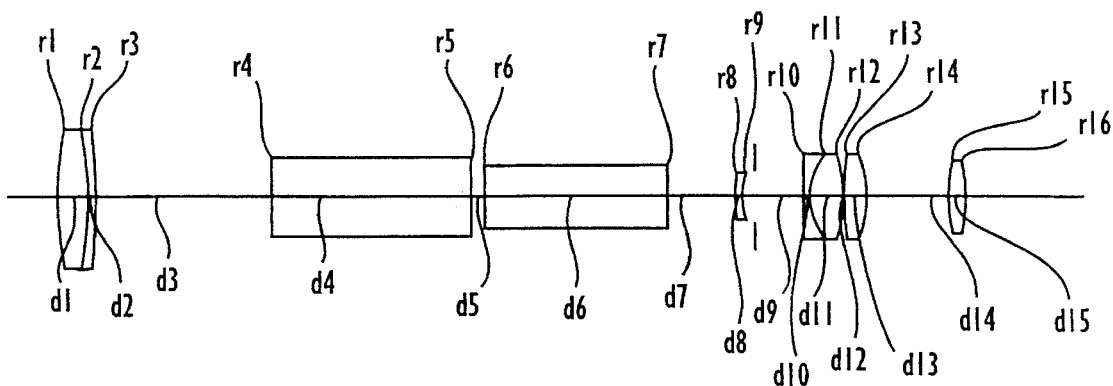
Figure 20A:
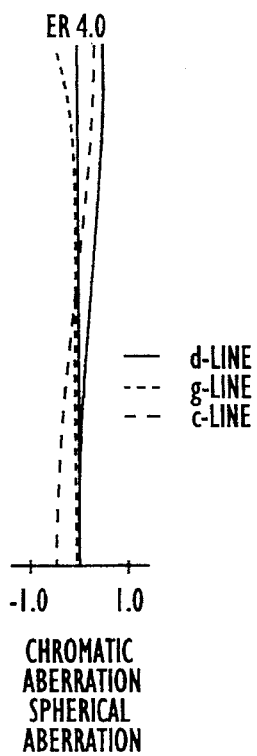
Figure 20B:
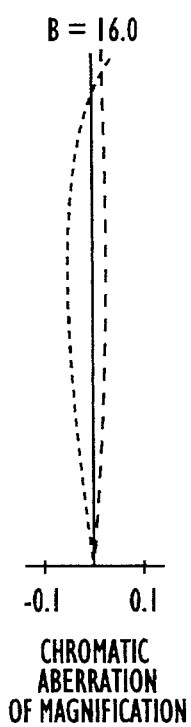
Figure 20C:
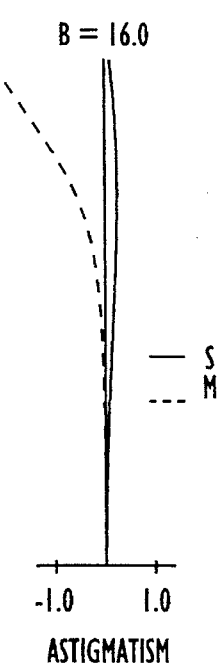
Figure 20D:
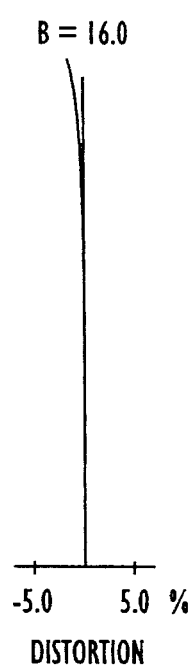
Figure 21:
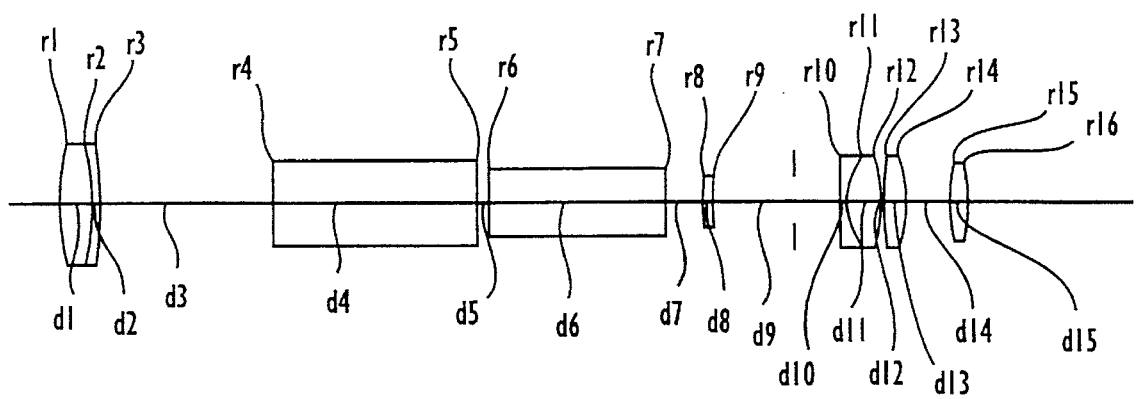
Figure 22A:
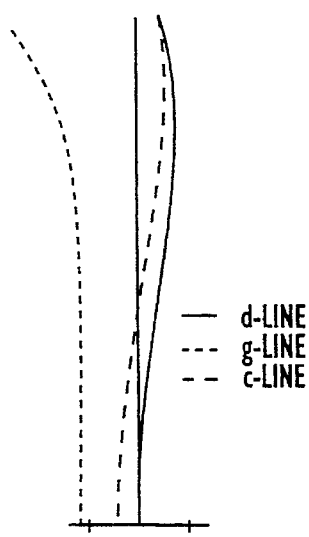
Figure 22B:
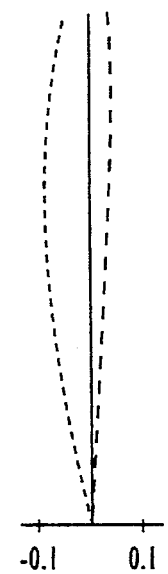
Figure 22C:
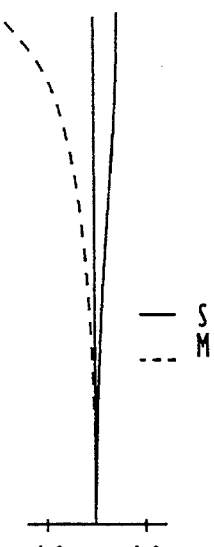
Figure 22D:
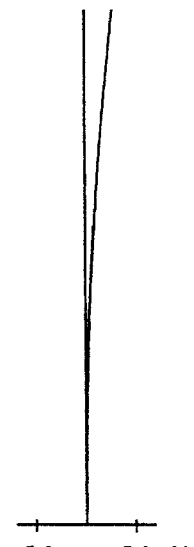

FIGS. 19, 21, and 23 show the third lens arrangement of the variable power optical system of the present invention. FIG. 19 shows an arrangement at the low magnification; FIG. 21 shows an arrangement at the middle magnification; and FIG. 23 shows an arrangement at the high magnification.

The values related to the above figures are shown in Table 7. In the third example, among the five lenses of the eye piece optical system, the first lens which is the closest to an object, and the fourth lens are made of synthetic resin. The legends in Table 7 are the same as Table 1. In the third arrangement of lens, magnification is changed in accordance with the changes of 37, d9, and d14. The values showing the changes are shown in Table 8. The surfaces from the fourth to the seventh are surfaces of an erect prism.

Aberrations in low magnification of this arrangement are shown in FIG. 20, middle magnification in FIG. 22, and high magnification in FIG. 24, respectively.

TABLE 7

| Surface No. | r | d | n | γ |
|---|---|---|---|---|
| 1 | 64.573 | 5.24 | 1.51633 | 64.1 |
| 2 | −33.768 | 1.52 | 1.62004 | 36.3 |
| 3 | −95.352 | 28.57 | | |
| 4 | infinity | 32.38 | 1.56883 | 56.3 |
| 5 | infinity | 1.91 | | |
| 6 | infinity | 28.57 | 1.56883 | 56.3 |
| 7 | infinity | variable | | |
| 8 | −160.979 | 1.24 | 1.492 | 54.7 |
| 9 | 14.802 | variable | | |
| 10 | −63.592 | 1.24 | 1.80518 | 25.4 |
| 11 | 14.623 | 6.57 | 1.71300 | 53.8 |
| 12 | −17.104 | 0.38 | | |
| 13 | 50.774 | 3.52 | 1.492 | 57.4 |
| 14 | −27.452 | variable | | |
| 15 | 24.422 | 2.67 | 1.51633 | 64.1 |
| 16 | 186.044 | | | |

TABLE 8

| | Magnification | | |
|---|---|---|---|
| | Low | Middle | High |
| $f_o$ | 100.00 | 136.95 | 165.18 |
| $f_e$ | 16.66 | 15.28 | 13.96 |
| ω (°) | 2.67 | 1.94 | 1.58 |
| d7 | 12.35 | 5.78 | 2.75 |
| d9 | 9.55 | 21.55 | 30.82 |
| d14 | 12.51 | 7.07 | 0.84 |

Since the variable power ratio between the focal length "few" of the ocular optical system at the low magnification and the focal length "fet" of the ocular optical system at the high magnification is 1.19 (few/fet), the change of the apparent field of view by the power variation can be decreased.

Table 9 shows the distance between the field stop ring and the surface "r10" which is the closest to the object's side in the eye piece optical system.

TABLE 9

| | Magnification | | |
|---|---|---|---|
| | Low | Middle | High |
| r10 | −7.00 | −7.52 | −8.01 |

What is claimed is:

1. A variable power optical system comprising:
an objective optical system which is located closer to an object than a field ring defining a field frame; and
an ocular optical system which is located closer to an eye than the field ring, said ocular optical system comprising an optical system whereby rays from an image point of said objective optical system transmitted through the ocular optical system are parallel;
wherein a power of the variable optical system is varied by moving at least a part of the ocular optical system, and a reference diopter being maintained constant upon movement of said at least a part of the ocular optical system to vary the power of said variable power optical system, said reference diopter being −1 diopter.

2. A variable power optical system according to claim 1, further comprising means for varying a diopter of said ocular optical system with respect to said reference diopter.

3. A variable power optical system according to claim 1, wherein a focal length of the ocular optical system at a low magnification and a focal length of the ocular optical system at a high magnification satisfy the following relationship:

$$few/fet \leq 1.30$$

wherein "few" designates the focal length of the ocular optical system at a low magnification, and "fet" designates the focal length of the ocular optical system at a high magnification, respectively.

4. A variable power optical system according to claim 1, said ocular optical system comprising a variable power lens group.

5. A variable power optical system according to claim 4, wherein the field ring is moved together with the variable power lens group.

6. The variable power optical system according to claim 1, a diopter corresponding to a point at which an image of the field ring is formed being equal to said reference diopter.

7. The variable power optical system according to claim 1, said field ring being movable during variation of the power of said variable power optical system.

8. The variable power optical system according to claim 7, and means for maintaining constant a diopter of said field ring upon movement of said field ring.

9. The variable power optical system according to claim 1, wherein movement of said field ring maintains said field ring in focus during variation of the power of said variable power optical system.

10. A variable power optical system comprising:
an objective optical system and a field ring which defines a field frame, said objective optical system located closer to an object than said field ring;
an ocular optical system located closer to an eye than said field ring, said ocular optical system comprising an optical system whereby rays from an image point of said objective optical system transmitted through said ocular optical system are parallel; and
means for varying a power of said optical system by moving at least a part of said ocular optical system, a reference diopter being set to a −1 diopter, said reference diopter being maintained constant upon movement of said at least a part of said ocular optical system for variation of the power of said variable power optical system.

11. The variable power optical system according to claim 10, further comprising means for varying a diopter of said ocular optical system with respect to said reference diopter.

12. The variable power optical system according to claim 10, said ocular optical system comprising a variable power lens group.

13. The variable power optical system according to claim 12, wherein said field ring is moved together with said variable power lens group.

14. The variable power optical system according to claim 10, wherein a focal length of said ocular optical system at a low magnification and a focal length of said ocular optical system at a high magnification satisfy the relationship few/fet ≤ 1.30,
wherein few designates a focal length of said ocular optical system at a low magnification and fet designates a focal length of said ocular optical system at a high magnification.

15. The variable power optical system according to claim 10, a diopter corresponding to a point at which an image of the field ring is formed being equal to said reference diopter.

16. The variable power optical system according to claim 10, said field ring being movable during variation of the power of said variable power optical system.

17. The variable power optical system according to claim 16, and means for maintaining constant a diopter of said field ring upon movement of said field ring.

18. The variable power optical system according to claim 10, wherein movement of said field ring maintains said field ring in focus during variation of the power of said variable power optical system.

19. A variable power optical system comprising:

an objective optical system which is located closer to an object than field ring defining a field frame; and an ocular optical system which is located closer to an eye than a field ring, said ocular optical system comprising an optical system, whereby rays from an image point of said objective optical system transmitted through said optical system are parallel;

wherein a power of the optical system is varied by moving at least a part of the ocular optical system and where in a focal length of the ocular optical system at a low magnification and a focal length of the ocular optical system at a high magnification satisfy the following relationship:

$$few/fet \leqq 1.30$$

wherein "few" designates the focal length of the ocular system at a low magnification, and "fet" designates the focal length of the ocular system at a high magnification.

20. A variable power optical system comprising:

an objective optical system and a field ring which defines a field frame, said objective optical system located closer to an object than said field ring;

an ocular optical system located closer to an eye than said field ring, said ocular optical system comprising an optical system whereby rays from an image point of said objective optical system transmitted through said ocular optical system are parallel; and means for varying a power of said optical system by moving at least said part of said ocular optical system, wherein a focal length of said ocular optical system at a low magnification and a focal length of said ocular optical system at a high magnification satisfy the relationship, $$few/fet \leqq 1.30,$$

wherein "few" designates the focal length of the ocular optical system at a low magnification, and "fet" designates the focal length of said ocular optical system at a high magnification.

* * * * *